(12) United States Patent
Ito

(10) Patent No.: US 8,386,888 B2
(45) Date of Patent: Feb. 26, 2013

(54) ERROR CORRECTING CIRCUIT AND DISK STORAGE DEVICE FOR DETECTING AND CORRECTING INSERTION AND/OR DELETION ERRORS

(75) Inventor: Toshio Ito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 262 days.

(21) Appl. No.: 12/849,722

(22) Filed: Aug. 3, 2010

(65) Prior Publication Data

US 2010/0296379 A1   Nov. 25, 2010

Related U.S. Application Data

(63) Continuation of application No. PCT/JP2009/000855, filed on Feb. 26, 2009.

(51) Int. Cl.
*G11C 29/00*       (2006.01)
(52) U.S. Cl. .................. 714/769; 369/30.22
(58) Field of Classification Search .......... 714/746, 714/761–764, 769, 774; 369/30.21, 30.22, 369/53.1, 53.41
See application file for complete search history.

(56) References Cited

U.S. PATENT DOCUMENTS

| | | | |
|---|---|---|---|
| 5,574,568 A * | 11/1996 | Juri et al. .................. | 386/329 |
| 6,362,754 B1 * | 3/2002 | Van Dijk et al. .................. | 341/59 |
| 7,667,912 B2 * | 2/2010 | Goldberg et al. .................. | 360/53 |
| 7,835,099 B2 * | 11/2010 | Mallary et al. .................. | 360/51 |
| 2008/0297936 A1 | 12/2008 | Takeo | |
| 2009/0003144 A1 | 1/2009 | Mallary et al. | |

FOREIGN PATENT DOCUMENTS

| | | |
|---|---|---|
| EP | 0 655 850 A2 | 10/1994 |
| JP | 63-157372 | 6/1988 |
| JP | 03-046167 | 2/1991 |
| JP | 07-176139 | 7/1995 |
| JP | H07-176139 | 7/1995 |
| JP | 2008-299975 | 12/2008 |

OTHER PUBLICATIONS

F.F. Sellers, Jr., "Bit Loss and Gain Correction Code," IRE Transactions on Information Theory, vol. IT-8, pp. 35-38, Jan. 1962.
Document Summary for JP 07-176139 & Non-Patent Literature Document, "Bit Loss and Gain Correction Code".
International Search Report issued by Japan Patent Office on May 19, 2009 in the corresponding PCT patent application No. PCT/JP2009/000855.
Japanese Office Action dated May 22, 2012 for Japanese Application No. 2010-506723.

\* cited by examiner

*Primary Examiner* — Scott Baderman
*Assistant Examiner* — Joseph Kudirka
(74) *Attorney, Agent, or Firm* — Knobbe, Martens, Olson & Bear, LLP

(57) ABSTRACT

An error correcting circuit includes a marker decoder for sampling 2-bit markers from a data string and, from sample values of the 2-bit markers, determine whether there is an occurrence of an error on the 2-bit markers, of an insertion error, or of a deletion error. The circuit also includes an error corrector for performing an error correction on the data string received from the marker decoder by using an error correcting code in the data string. When either one of the insertion error and the deletion error is determined to have occurred, the marker decoder can perform another error correction on the either one of the insertion error and the deletion error, and output the data string from which the 2-bit markers are removed.

12 Claims, 13 Drawing Sheets

|  | MARKER VALUE |
|---|---|
| NO OCCURRENCE OF I/D ERROR | 10 |
| INSERTION ERROR | 01 |
|  | 11 |
| DELETION ERROR | 00 |
|  | 01 |

M ... ME

| NO OCCURRENCE OF I/D ERROR | 010010010010 |
|---|---|
| INSERTION ERROR | 001001001001 |
|  | 101001001001 |
| DELETION ERROR | 100100100100 |
|  | 100100100101 |

ERROR CORRECTING CIRCUIT AND DISK STORAGE DEVICE FOR DETECTING AND CORRECTING INSERTION AND/OR DELETION ERRORS

CROSS-REFERENCE TO RELATED APPLICATIONS

This application is a continuation of PCT international application Ser. No. PCT/JP2009/000855 filed on Feb. 26, 2009 which designates the United States, incorporated herein by reference.

FIELD

Embodiments described herein relate generally to an error correcting circuit and a disk storage device.

BACKGROUND

In a disk storage device such as a magnetic disk device, a continuous recording medium has been in use as the disk storage medium. In recent years, with the purpose of enhancing the recording density, a technique of using a non-continuous medium having recording dots formed thereon has been disclosed as a substitute to the continuous recording medium. This technique is known as bit-patterned media (BPM) recording.

For a magnetic head to perform recording in the isolated storage dots, a writing cycle method is employed. FIG. 1 is an explanatory diagram for explaining the writing cycle method. As illustrated in FIG. 1, the writing cycle method comprises correcting a write clock WRC in accordance with the spacing between recording dots DT and then recording the write data in synchronization with the write clock WRC. That enables writing of data in each dot DT in a correct manner.

In connection with the writing cycle method, an error correction method becomes necessary for correcting errors at the time of writing. Particularly, an error correction method becomes necessary for correcting insertion/deletion errors.

The possible causes of an insertion/deletion error are eccentricity of the disk or high-order variation attributed to processes. FIG. 2 is an explanatory diagram for explaining a disk having eccentricity. As illustrated in FIG. 2, the center of a disk 1000 is out of alignment with respect to a rotation axis 1100. Hence, on the disk 1000, a high-velocity area 1020 and a low-velocity area 1010 come into existence. Because of such differences in the rotating velocity, on a single track as illustrated in FIG. 3, the write clock WRC and the recording dots DT fall out of synchronization.

As illustrated in FIG. 3, in the area of high rotating velocity, the position of each dot DT appears to have widened with reference to the write clock WRC. In such an area, data (single bit) that is in synchronization with the write clock WRC cannot be recorded thereby causing the loss of a single bit. This phenomenon is known as a deletion error.

In contrast, in the area of slow rotating velocity, the position of each dot DT appears to have narrowed with reference to the write clock WRC. At such an area, two recording dots DT get accommodated in synchronization with the write clock WRC thereby leading to the addition of a single bit. This phenomenon is known as an insertion error.

Upon occurrence of a single-bit insertion/deletion error, the recording data subsequent to the location of that error gets shifted thereby triggering a shift error, which in turn leads to a burst error state. For example, in FIG. 4 is illustrated the condition when a single-bit insertion error occurs at the fourth bit of otherwise error-free sector data. As illustrated in FIG. 4, upon occurrence of the single-bit insertion error, the bit sequence subsequent to the location of that error gets shifted to the right thereby leading to a burst error state.

Such a state goes beyond the error correcting capability of an error correcting code such as the Reed-Solomon code that is used in magnetic disk devices. Hence, error correction cannot be accomplished.

A method for correcting insertion/deletion errors in connection with the write synchronization has been proposed for a magnetic tape or an optical disk. For example, as an insertion/deletion error correction method, a 3-bit marker method has been proposed by F. F. Sellers (see F. F. Sellers Jr, "Bitloss and gain correction code," IRE Trans. Inform. Theory, vol. IT-8, pp. 35-38, January 1962).

FIG. 5 illustrates a 3-bit marker coding method proposed in the conventional technology. As illustrated in FIG. 5, coding is performed by inserting a 3-bit marker MK having the value "100" once after every predetermined bit length (herein, m>1 bit) in an original data string.

Upon occurrence of an insertion/deletion error, the value of the 3-bit marker MK gets shifted due to the occurrence of a shift error. Thus, correction of the insertion/deletion error is performed by referring to the shifted value.

Meanwhile, a method of using a 2-bit marker has been disclosed (for example, see Japanese Patent Application Publication (KOKAI) No. H7-176139) as a substitute to the use of a 3-bit marker method. In the 2-bit marker method, coding is performed by inserting a 2-bit marker MK having the value "01" once after every predetermined length, followed by the detection of an insertion/deletion error.

In order to enhance the recording density, the redundant bits need to be reduced. In the case of employing a marker method, the 2-bit marker method produces less redundancy than the 3-bit marker method.

However, in the 2-bit marker method, the existence of a common error bit on the marker leads to a decline in the error correcting capability. For example, if the first bit of the marker value "01" is a normal single-bit error, then the value "11" gets detected as the marker value.

Thus, the existence of a common error bit on the marker leads to inaccurate correction, which in turn triggers a shift error and thus causes a burst error.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an error correcting circuit is configured to receive a data string having a plurality of 2-bit markers inserted therein at predetermined intervals of bit numbers and configured to perform error correction. The error correcting circuit comprises a marker decoder and an error correcting module. The marker decoder is configured to sample the 2-bit markers from the data string and, from a plurality of sample values of the 2-bit markers, determine whether there is an occurrence of an error on the 2-bit markers, of an insertion error, or of a deletion error. The error correcting module is configured to perform first error correction on the data string received from the marker decoder by using an error correcting code in the data string. When either one of the insertion error and the deletion error is determined to have occurred, the marker decoder is configured to perform second error correction on the either one of the insertion error and the deletion error, and output the data string from which the 2-bit markers are removed.

According to another embodiment, a disk storage device comprises a maker coder, a head, a maker decoder, and an error correcting module. The marker coder is configured to insert a plurality of 2-bit markers at predetermined intervals of bit numbers in a data string. The head is configured to record the data string received from the marker coder in a disk medium under rotation, and to read recorded data string from the disk medium. The marker decoder is configured to sample the 2-bit markers from the data string read by the head and, from a plurality of sample values of the 2-bit markers, determine whether there is an occurrence of an error on the 2-bit markers, of an insertion error, or of a deletion error. The error correcting module is configured to perform first error correction on the data string received from the marker decoder by using an error correcting code in the data string. When either one of the insertion error and the deletion error is determined to have occurred, the marker decoder is configured to perform second error correction on the either one of the insertion error and the deletion error, and output the data string from which the 2-bit markers are removed.

Various embodiments will be described hereinafter in the order of a disk storage device, a signal recording/reproducing circuit, and a first embodiment of a marker decoder; a second embodiment of the marker decoder; and other embodiments with reference to the accompanying drawings.

Figure 6:
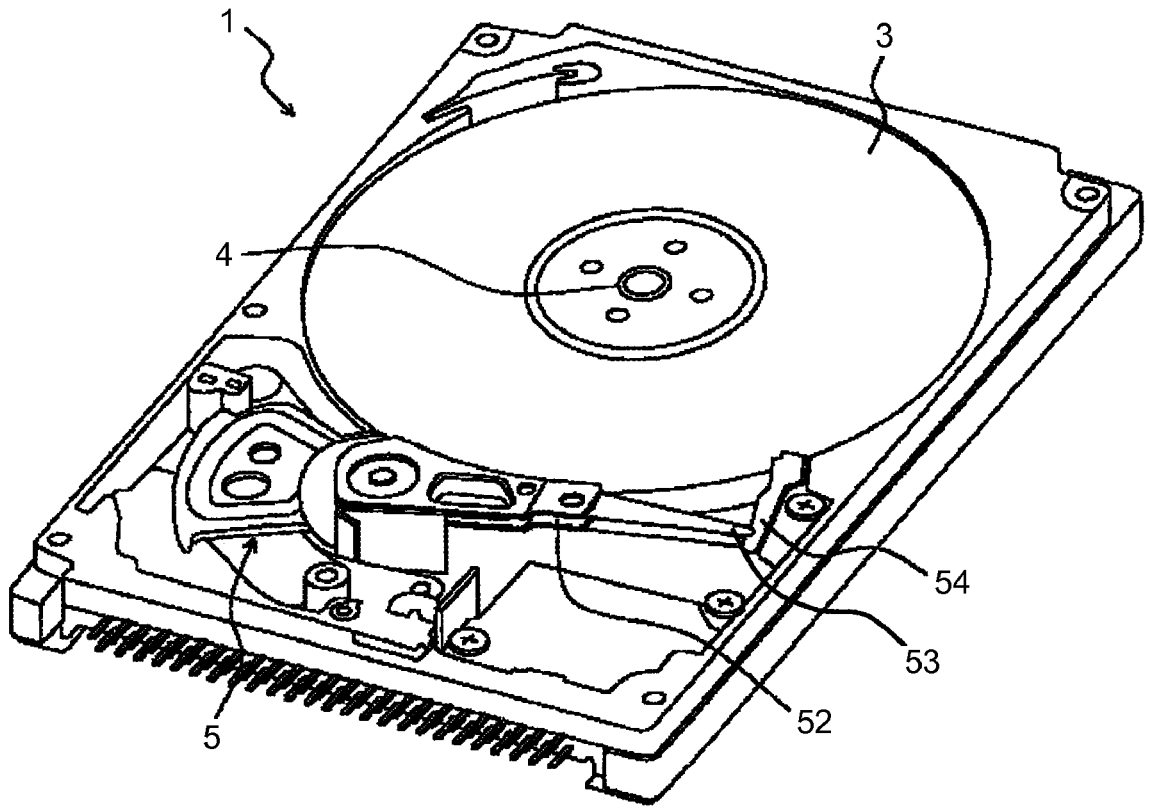
FIG. 6 is an exemplary external view of a disk storage device in the embodiment.

FIG. 6 is an exemplary external view of a disk storage device according to an embodiment. In FIG. 6, a magnetic disk device (hard disk drive: HDD) is given as an example of the disk storage device.

As illustrated in FIG. 6, a disk enclosure (DE) 1 houses the constituent elements of the magnetic disk device. Inside the DE 1, a magnetic disk 3 that is a magnetic recording medium is disposed around the rotary shaft of a spindle motor 4.

The spindle motor 4 fixed to the DE 1 rotates the magnetic disk 3. An actuator 5 rotates an arm (head actuator) 52 with a suspension (not illustrated) attached thereto. At the leading end of the suspension is disposed a magnetic head 53. The actuator 5 moves the magnetic head 53 along the radial direction of the magnetic disk 3.

The actuator 5 is a voice coil motor (VCM) that rotates around the rotary shaft. In the magnetic disk device illustrated in FIG. 6, a single magnetic disk 3 is disposed and two magnetic heads 53 are simultaneously driven by the VCM 5.

Each magnetic head 53 comprises a read element and a write element, and is manufactured by laminating the read element comprising a magnetic resistance (MR) element on a slider and then laminating the write element comprising a write coil on the read element.

On the outside of the magnetic disk 3 is disposed a ramp mechanism 54 for parking the magnetic heads 53 away from the magnetic disk 3.

At the bottom part of the DE 1 illustrated in FIG. 6 is disposed a printed circuit assembly. On the printed circuit assembly are disposed a hard disk controller (HDC), a microcontroller unit (MCU), a read/write channel (RDC) circuit, a servo controller circuit, a data buffer (random access memory: RAM), and a read only memory (ROM) described later with reference to FIG. 8 and onward. Meanwhile, as the magnetic disk 3 is used a bit-patterned medium described later. Moreover, the magnetic heads 53 are configured to be a perpendicular recording head.

Figure 1:
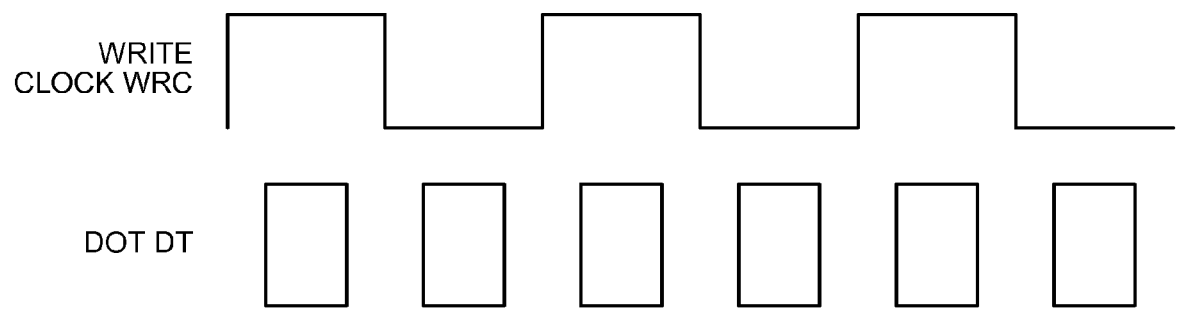
FIG. 1 is an explanatory diagram for explaining the writing cycle method according to an embodiment.
Figure 7:
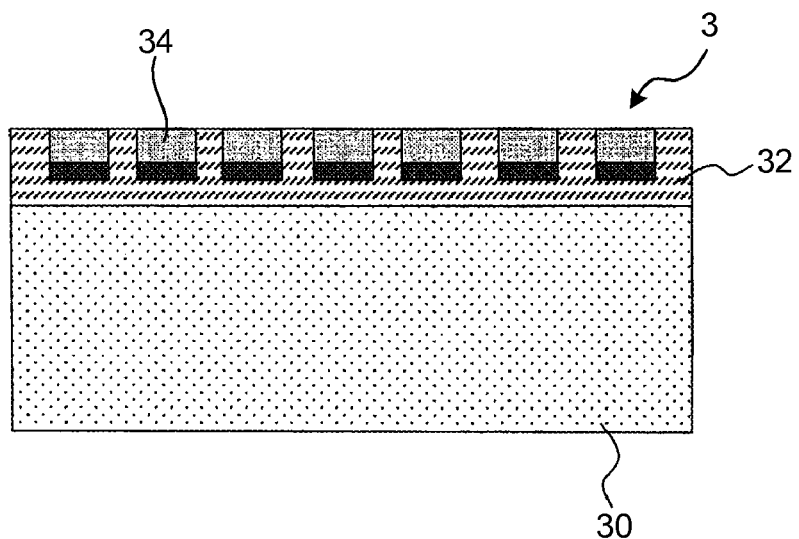
FIG. 7 is an exemplary cross-sectional view of the disk medium illustrated in FIG. 6 in the embodiment.

FIG. 7 is an exemplary cross-sectional view of the magnetic disk 3 illustrated in FIG. 1. As illustrated in FIG. 7, the magnetic disk 3 has a multilayered structure in which a soft magnetic lining layer 32 is formed on a substrate 30 and a magnetic recording layer (made of a hard magnetic material) 34 is formed on the soft magnetic lining layer 32. The magnetic recording layer 34 has dot-shaped recesses formed on the soft magnetic lining layer 32. Each recording dot is formed in an isolated manner.

Figure 8:
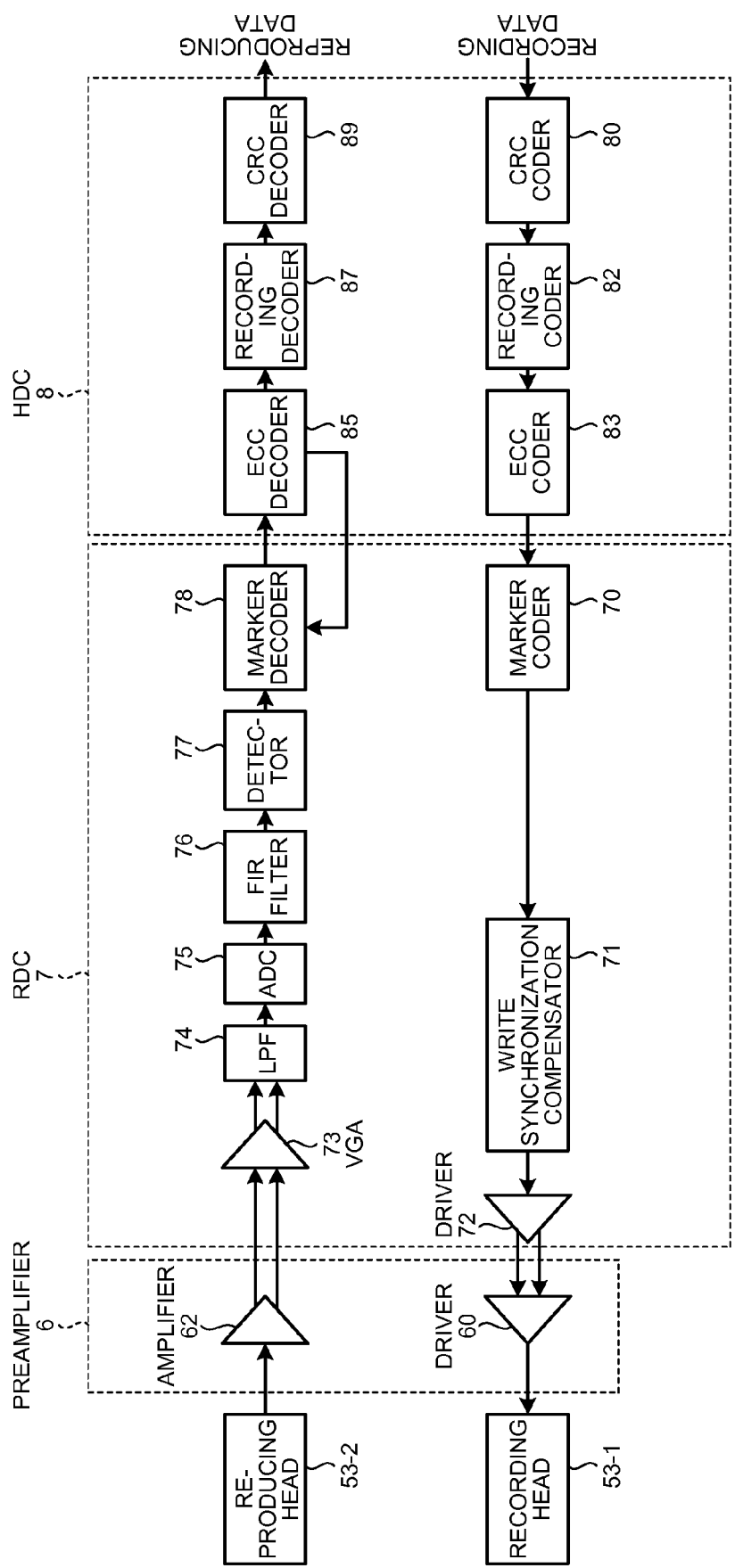
FIG. 8 is an exemplary circuit block diagram of a recording/reproducing system in the embodiment.

FIG. 8 is an exemplary circuit block diagram of essential parts in a recording/reproducing system according to the embodiment. As illustrated in FIG. 8, the recording/reproducing system of the magnetic disk device mainly comprises an HDC 8, an RDC 7, and a preamplifier circuit 6.

Given below is the explanation of the recording system. The recording data is input to the HDC 8, inside which a cyclic redundancy code (CRC) coder 80 creates a CRC from the recording data and appends CRC parity to the recording data. A recording coder 82 converts the recording data string appended with CRC parity into a string that satisfies restraint conditions such as a run length limited (RLL) code. Then, an ECC coder 83 appends an error correcting code (ECC) to the data string output from the recording coder 82.

The data string output from the ECC coder 83 in the HDC 8 is input to a marker coder 70 that is disposed in the RDC 7. As described later with reference to FIG. 9, the marker coder 70 performs coding by inserting a predetermined number of 2-bit markers. Subsequently, a write synchronization compensator 71 compensates the data string so that it falls in synchronization with a write clock.

The data string subjected to write synchronization compensation passes through a driver 72, which sends the recording data to the preamplifier 6. In the preamplifier 6, a driver 60 generates a write current for a recording head 53-1.

Given below is the explanation of the reproducing system. Firstly, an amplifier 62 in the preamplifier 6 amplifies an analog voltage from a reproducing head 53-2 and outputs the amplified analog signal to the RDC 7. Inside the RDC 7, the amplified analog signal passes through a variable gain amplifier (VGA) 73, a lowpass filter (LPF) 74, and an analog-to-digital converter (ADC) 75, and is converted into a digital signal.

Subsequently, a finite impulse response (FIR) filter 76 performs partial response (PR) waveform equalization and then a detector 77 such as a Viterbi detector performs maximum-likelihood decoding. As described later, a marker decoder 78 detects insertion/deletion errors by referring to the 2-bit markers inserted by the marker coder 70 and performs error correction.

The bit sequence output by the marker decoder 78 upon performing insertion/deletion error correction is input to an ECC decoder 85 that is disposed in the HDC 8. The ECC decoder 85 performs error correction by using a Reed-Solomon (RS) code. If ECC decoding is successful, then the data string output from the ECC decoder 85 passes through a recording decoder 87 and a CRC decoder 89, and is output as reproduced data.

On the other hand, if ECC decoding is not successful, then the ECC decoder 85 outputs a failure flag to the marker decoder 78, which then refers to error location information regarding insertion/deletion errors that have occurred in neighboring sectors and repeats error correction by estimating the location of the insertion/deletion error to be corrected.

Figure 9:
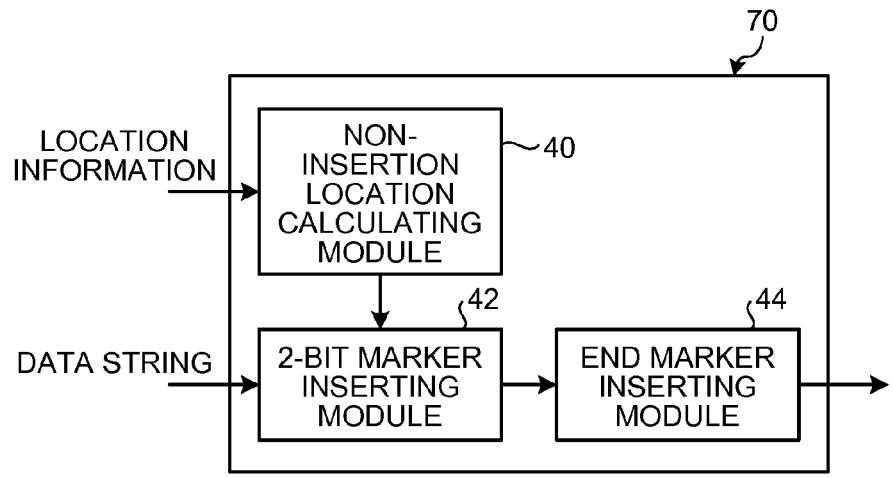
FIG. 9 is an exemplary block diagram of the marker coder illustrated in FIG. 8 in the embodiment.
Figure 10:
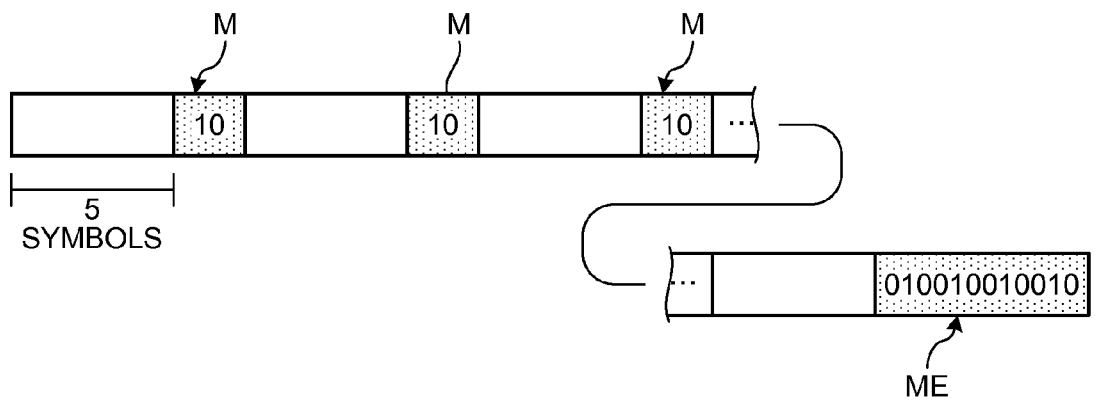
FIG. 10 is an explanatory diagram for explaining the marker coding illustrated in FIG. 9 in the embodiment.

FIG. 9 is an exemplary block diagram of the marker coder 70 illustrated in FIG. 8. FIG. 10 is an explanatory diagram of using 2-bit markers with reference to FIG. 9. As illustrated in FIG. 9, as the basic configuration, the marker coder 70 comprises a 2-bit marker inserting module 42 and an end marker inserting module 44. Besides, when needed, a non-insertion location calculating module 40 is disposed in the marker coder 70.

The 2-bit marker inserting module 42 appends a marker value M (herein, M=10 as illustrated in FIG. 10) once after every predetermined data length in a single sector. Herein, for example, it is assumed that the sector size is four kilobytes and a Reed-Solomon code of 1 symbol=12 bits is used in the ECC coder.

Herein, it is assumed that a single sector indicates the state in which a Reed-Solomon code parity is appended to the data sector. In FIG. 10, markers are illustrated to have been inserted in a single sector. In this case, the 2-bit marker inserting module 42 appends the marker value "10" once after every predetermined data length.

Besides, the end marker inserting module 44 appends a marker value "010010010010" at the end of the sector and then outputs the sector. In FIG. 10, it is illustrated that the marker value "10" is appended after every five symbols, that is, after every 60 bits and that the marker value "010010010010" is appended at the end of the sector.

The 12-bit marker is appended at the end of the sector because using only the 2-bit marker may not be sufficient to determine whether an insertion error has occurred or a deletion error has occurred at the decoding side. The details regarding that point are given later.

Figure 11:
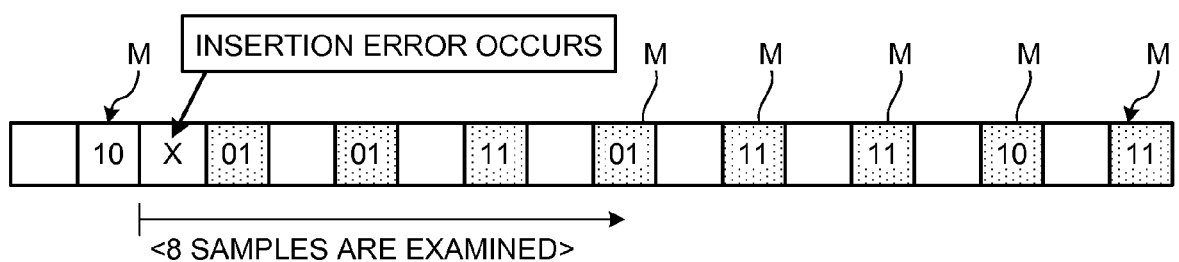
FIG. 11 is an explanatory diagram for explaining a 2-bit marker decoding method in the embodiment.
Figures 12, 13, 14:
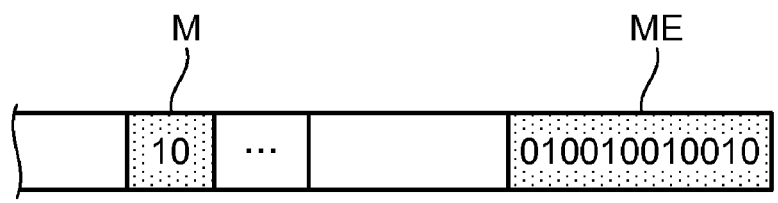
FIG. 12 is an explanatory diagram for explaining a marker value of decoding method illustrated in FIG. 11 in the embodiment.
FIG. 13 is an explanatory diagram for explaining an end marker decoding method in the embodiment.
FIG. 14 is an explanatory diagram for explaining a marker value of decoding method illustrated in FIG. 13 in the embodiment.

Explained below is the marker decoding principle of the of the marker decoder 78. FIG. 11 is an explanatory diagram for explaining an insertion/deletion error correction operation performed by the marker decoder 78 with the use of a 2-bit marker. FIG. 12 is an explanatory diagram for explaining an insertion/deletion error detection operation performed by the marker decoder 78 with the use of a 2-bit marker.

The marker decoder 78 detects the occurrence of an insertion/deletion error by referring to the marker values. In FIG. 11, a single-bit insertion error is illustrated to have occurred. Since the occurrence of an insertion error triggers a shift error, the marker value undergoes changes. In FIG. 12, the marker values are given for the following cases: no occurrence of an insertion/deletion error; occurrence of an insertion error; and occurrence of a deletion error. For no occurrence of an insertion/deletion error, the marker value is "10"; for the occurrence of an insertion error, the marker value is either "01" or "11"; and for the occurrence of a deletion error, the marker value is either "01" or "00".

As can be seen in FIG. 12, the marker value is "01" when either one of an insertion error and a deletion error occurs. Thus, when the marker value is "01", it is not possible to determine whether an insertion error has occurred or a deletion error has occurred. For example, with reference to FIG. 11, immediately after the occurrence of an insertion error indicated by the symbol "x", the marker value is "01". However, with that marker value, it is not possible determine whether an insertion error has occurred or a deletion error has occurred.

Thus, as illustrated in FIG. 11, error identification is performed by referring to a few samples of the marker values positioned subsequent to the marker value lying immediately after the occurrence of an insertion error. In FIG. 11, error identification is performed by examining eight samples of the marker values. In the example illustrated in FIG. 11, among the eight samples, four samples have the marker value "01" and four samples have the marker value "11".

Since the eight samples comprise four samples having the marker value "11" that indicates the occurrence of an insertion error, the marker decoder 78 determines that an insertion error has occurred.

Herein, since the probability for the marker value lying immediately after the occurrence of an insertion error to be "01" as well as the probability for the marker value lying immediately after the occurrence of an insertion error to be "11" is ½, only a few samples adequate for the purpose.

Meanwhile, the nature of insertion/deletion errors is such that, once an insertion/deletion error occurs, the subsequent insertion/deletion error does not occur for a while. Hence, referring to a few samples of the marker values becomes an effective method.

FIG. 13 is an explanatory diagram for explaining an insertion/deletion error correction operation performed by the marker decoder 78 with the use of an end marker. FIG. 14 is an explanatory diagram for explaining an insertion/deletion error detection operation performed by the marker decoder 78 with the use of an end marker.

As illustrated in FIG. 13, the end marker has a 12-bit value. In FIG. 14, the marker values of the end marker are illustrated for the following cases: no occurrence of an insertion/deletion error; occurrence of an insertion error; and occurrence of a deletion error. For no occurrence of an insertion/deletion error, the marker value of the end marker is "010010010010"; for the occurrence of an insertion error, the marker value of the end marker is either "001001001001" or "101001001001"; and for the occurrence of a deletion error, the marker value of the end marker is either "100100100100" or "100100100101". Since each marker value is different, error identification can be performed with only a single sample of the end marker.

Figure 15:
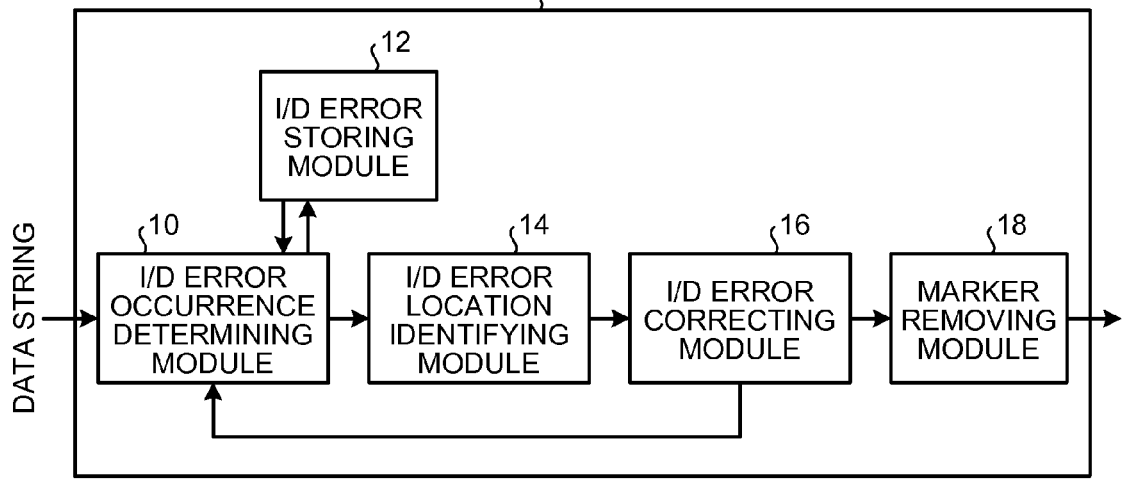
FIG. 15 is an exemplary block diagram of a first embodiment of the marker decoder.
Figure 16:
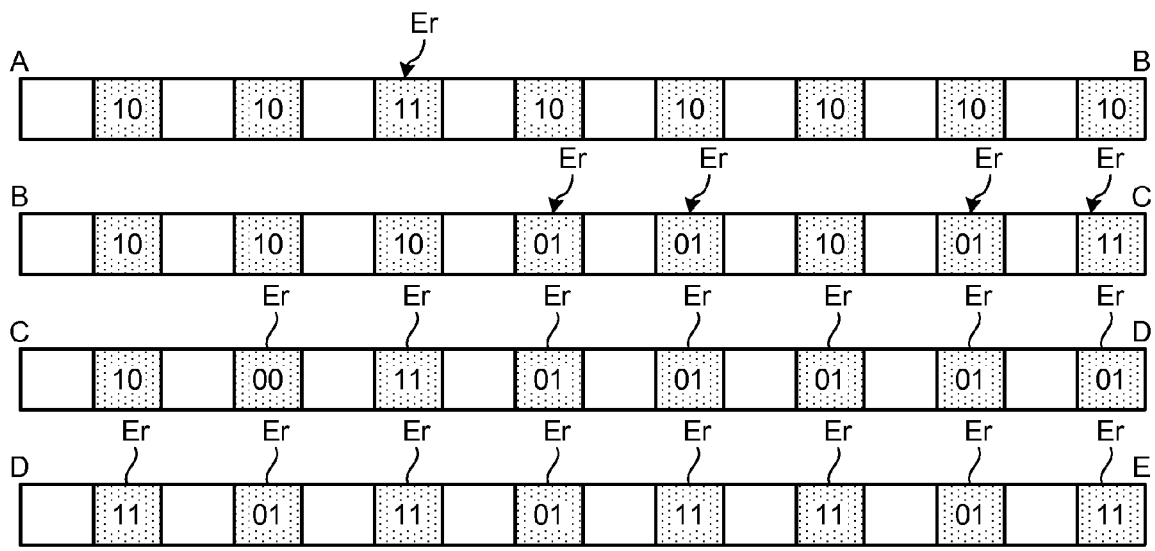
FIG. 16 is an explanatory diagram for explaining an insertion/deletion error detection operation performed with the use of the 2-bit marker of the decoder illustrated in FIG. 15 in the first embodiment.
Figure 17:
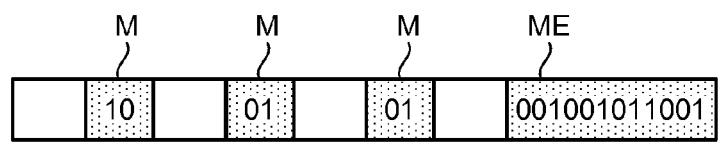
FIG. 17 is an explanatory diagram for explaining the insertion/deletion error detection operation performed with the use of the end marker of the decoder illustrated in FIG. 15 in the first embodiment.

FIG. 15 is an exemplary block diagram of the marker decoder 78 according to a first embodiment. FIG. 16 is an explanatory diagram for explaining the insertion/deletion error detection operation performed with the use of a 2-bit marker. FIG. 17 is an explanatory diagram for explaining the insertion/deletion error detection operation performed with the use of an end marker.

As the basic configuration illustrated in FIG. 15, the marker decoder 78 comprises an insertion/deletion (I/D) error occurrence determining module 10, an I/D error location identifying module 14, an I/D error correcting module 16, a marker removing module 18, and an I/D error storing module 12.

The I/D error occurrence determining module 10 determines whether an insertion/deletion error has occurred by examining which marker values of the eight marker values illustrated in FIG. 10 have a high frequency of occurrence.

More particularly, if the marker values "01", "11", and "00" indicating the occurrence of an insertion/deletion error appear for seven times or more in the eight 2-bit markers, then the I/D error occurrence determining module 10 determines that an insertion/deletion error has occurred and has triggered a shift error and then determines whether an insertion error has occurred or a deletion error has occurred. On the other hand, if the marker values "01", "11", and "00" indicating the occurrence of an insertion/deletion error appear for six times or less in the eight 2-bit markers, then the I/D error occurrence determining module 10 determines that it is not clear whether a shift error has occurred due to an insertion/deletion error.

Meanwhile, if the marker value "10" indicating the absence of an insertion/deletion error appears for six times or more in the eight 2-bit markers, then the I/D error occurrence determining module 10 determines that no insertion/deletion has occurred.

In FIG. 16 is illustrated an example of a received string that is divided into four received strings after every eight 2-bit markers (represented by dotted portions). Herein, the method of error determination employed by the I/D error occurrence determining module 10 is explained below with reference to the received strings illustrated in FIG. 16.

Firstly, the I/D error occurrence determining module 10 examines the eight 2-bit markers in the AB section, in which the 2-bit marker having the value "10" indicating the absence of an insertion/deletion error appears for seven times and a 2-bit marker Er having the value "11" indicating the occurrence of an insertion/deletion error appears once. Since the 2-bit marker indicating the absence of an insertion/deletion error appears for six times or more, the I/D error occurrence determining module 10 determines that no insertion/deletion has occurred.

Thus, even if the 2-bit marker Er having the value "11" indicating the occurrence of an insertion/deletion error appears once, it is determined to be a common error on a 2-bit marker and the AB section is determined to be free of any insertion/deletion error.

Subsequently, the I/D error occurrence determining module 10 examines the eight 2-bit markers in the BC section, in which the 2-bit marker having the value "10" indicating the absence of an insertion/deletion error appears for four times and the 2-bit marker Er having the values "11" and "01" indicating the occurrence of an insertion/deletion error appears for four times. Hence, the I/D error occurrence determining module 10 determines that it is not clear whether a shift error has occurred due to an insertion/deletion error.

Then, the I/D error occurrence determining module 10 examines the eight 2-bit markers in the CD section, in which the 2-bit marker having the value "10" indicating the absence of an insertion/deletion error appears once and the 2-bit marker Er having the values "11", "01", and "00" indicating the occurrence of an insertion/deletion error appears for seven times. Hence, the I/D error occurrence determining module 10 determines that an insertion/deletion error has occurred and has triggered a shift error.

Subsequently, in order to determine whether an insertion error has occurred or a deletion error has occurred, the I/D error occurrence determining module 10 counts the number of 2-bit markers having the value "11" indicating an insertion error and the number of 2-bit markers having the value "00" indicating a deletion error. In the CD section, since there is a single 2-bit marker having the value "11" and a single 2-bit marker having the value "00", it is not possible to determine whether an insertion error has occurred or a deletion error has occurred.

Subsequently, if no information is already stored in the I/D error storing module 12, then the I/D error occurrence determining module 10 examines the eight 2-bit markers in the DE section, in which the 2-bit marker Er having the value "11"

appears for five times and the 2-bit marker Er having the value "00" does not appear. Upon counting up the 2-bit markers in the DE section and in the CD section, the 2-bit marker Er having the value "11" appears for six times and the 2-bit marker Er having the value "00" appears once.

Since the 2-bit marker Er having the value "11" appears for more number of times, the I/D error occurrence determining module 10 determines that an insertion/deletion error has occurred and has triggered a shift error in the CD section and also determines that the 2-bit marker Er having the value "00" in the CD section appears because of a common error. Then, the I/D error occurrence determining module 10 outputs the information that the occurrence of an insertion/deletion error has triggered a shift error in the CD section as well as the information that the AB section was the last section without an insertion/deletion error.

If the current insertion error is the first occurrence of an insertion error, then the I/D error occurrence determining module 10 stores information such as "occurrence of insertion error in this section" in the I/D error storing module 12.

As described above, after determining that a shift error has occurred in the CD section, the I/D error occurrence determining module 10 refers to the I/D error storing module 12. If the information such as "occurrence of insertion error in this section" (or "occurrence of deletion error in this section") has been stored in the I/D error storing module 12, then the I/D error occurrence determining module 10 does not examine the section DE and uses the stored information for determining that the occurrence of an insertion error (or a deletion error) has triggered a shift error in the CD section.

Figure 2:
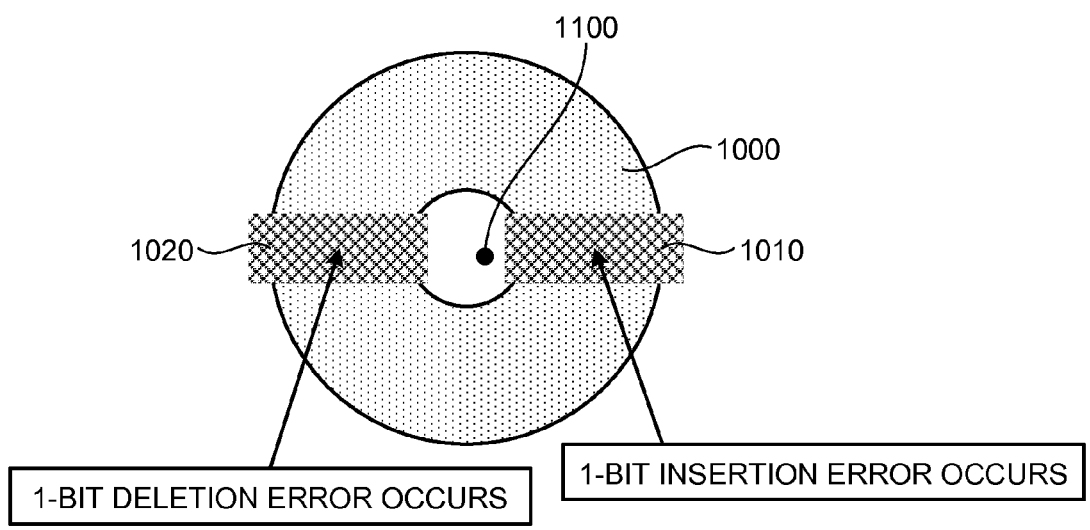
FIG. 2 is an explanatory diagram for explaining a disk having eccentricity in the embodiment.
Figure 3:
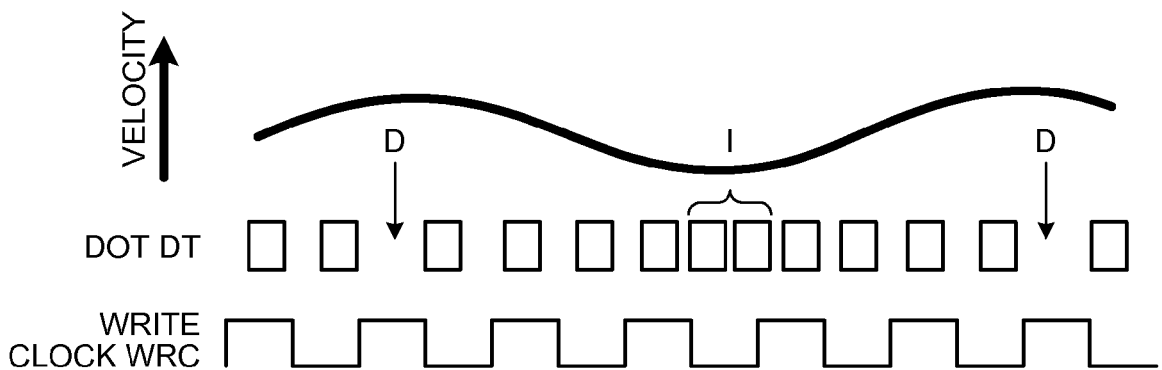
FIG. 3 is an explanatory diagram for explaining an insertion/deletion error in the embodiment.

As described with reference to FIG. 2, the area in which an insertion error occurs is separated from the area in which a deletion error occurs. Thus, in a single sector, an insertion error can occur or a deletion error can occur but not both. For that reason, once the information is stored in the I/D error storing module 12, it can be used.

Explained below is the insertion/deletion error detection operation performed at the end of the sector by making use of the end part of the received string as illustrated in FIG. 17. At the end of the sector, using only the 2-bit marker may not be sufficient to determine whether an insertion error has occurred or a deletion error has occurred. Hence, the I/D error occurrence determining module 10 performs that determination by making use of an end marker ME.

That is, the I/D error occurrence determining module 10 performs error identification by counting the number of "1" appearing in the end marker ME. In the received string illustrated in FIG. 17, the two 2-bit markers M placed prior to the end marker ME have the value "01" indicating the occurrence of an insertion/deletion error.

Figure 4:
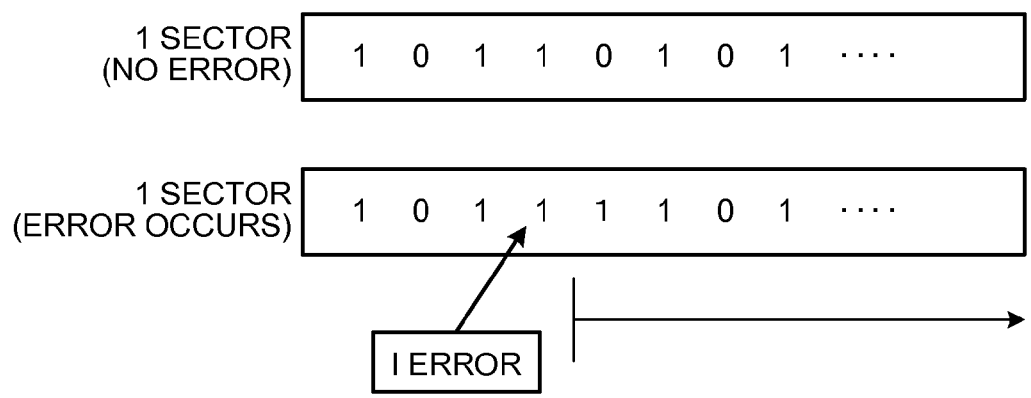
FIG. 4 is an explanatory diagram for explaining a shift of data due to the insertion error in the embodiment.
Figure 5:
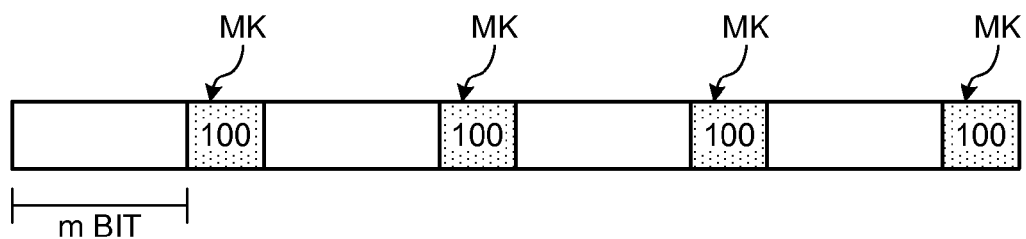
FIG. 5 is an explanatory diagram for explaining a conventional 3-bit marker coding method.

Consider the comparison of the end marker ME illustrated in FIG. 17 with the table of values of the normal end marker illustrated in FIG. 14. In the case of no insertion/deletion error, a single "1" corresponding to the positions of "1" illustrated in FIG. 14 appears in the end marker ME. In the case of an insertion error, four "1" corresponding to the positions of "1" illustrated in FIG. 4 appear in the end marker ME. In the case of a deletion error, no "1" corresponding to the positions of "1" illustrated in FIG. 14 appears in the end marker ME.

Hence, the number of "1" appearing in the case of an insertion error becomes larger than the number of "1" in the other cases. Consequently, the I/D error occurrence determining module 10 determines that an insertion error has occurred and has triggered a shift error at the end of the sector and then outputs that information.

Given below is the explanation regarding the I/D error location identifying module 14 illustrated in FIG. 15. Herein, FIGS. 18 to 25 are explanatory diagrams for explaining the operations performed by the I/D error location identifying module 14.

The I/D error location identifying module 14 identifies the location at which the insertion error (or the deletion error) had occurred by making use of the information regarding the section in which the occurrence of an insertion error (or a deletion error) had triggered a shift error and the information regarding the last section without an insertion/deletion error that is output by the I/D error occurrence determining module 10.

The error location is identified by employing a location identification method using the inter-marker Hamming distance, as explained below with reference to FIGS. 18 to 20. For example, upon receiving the information that the AB section was the last section without an insertion/deletion error and the information that the occurrence of a deletion error had triggered a shift error in the CD section as illustrated in FIG. 16, the I/D error location identifying module 14 arranges a marker string MA0 having no insertion/deletion errors in the AD section that includes the AB section and the CD section as illustrated in FIGS. 18 and 19.

The marker strings MA0 have the correct marker values of "10". The I/D error location identifying module 14 calculates the inter-marker Hamming distance between the marker string MA0 and the received string (AD section). Meanwhile, in FIGS. 18 and 19, the 2-bit markers are represented by dotted portions and the numbers in the blocks adjacent to the 2-bit markers represent block numbers. Herein, for example, five symbols constitute a single block.

Figure 18:
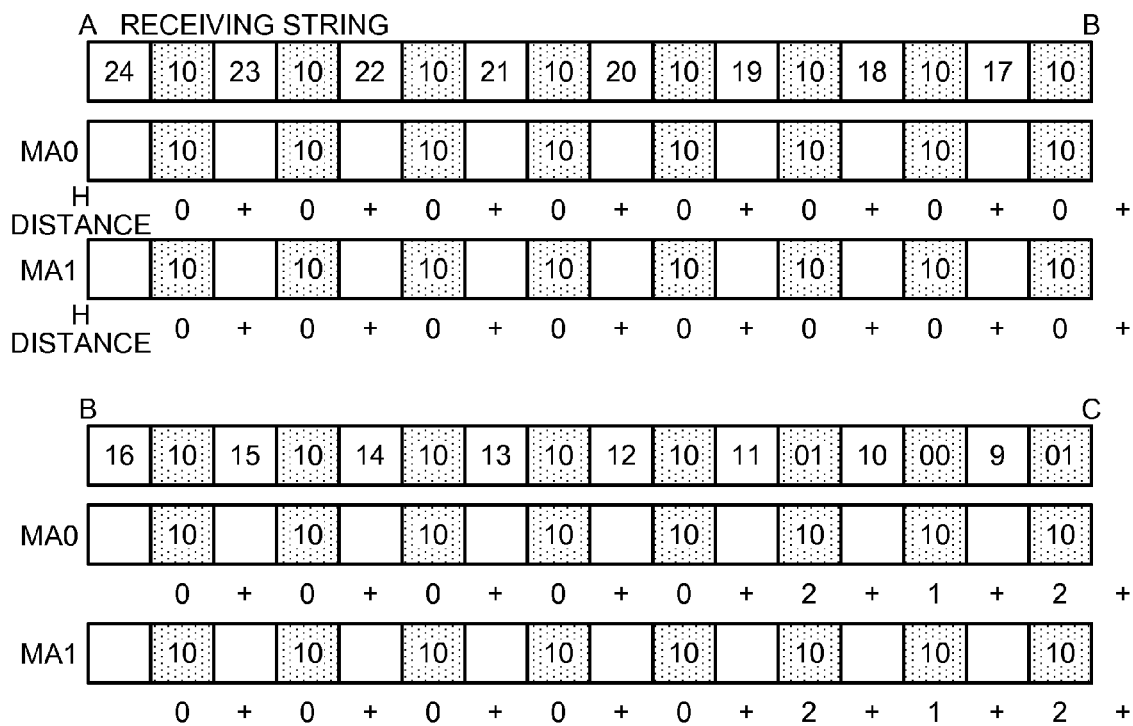
FIG. 18 is an explanatory diagram for explaining an AC section of a process identifying the locations of the occurrence of insertion/deletion errors of the decoder illustrated in FIG. 15 in the first embodiment.
Figure 19:
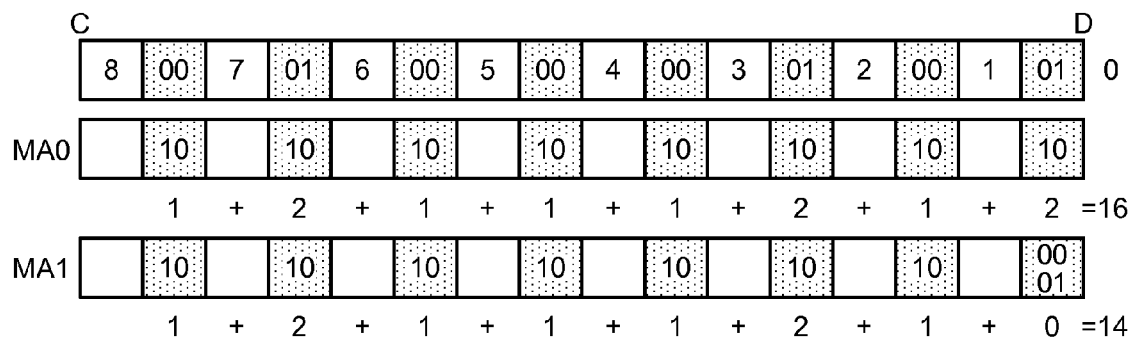
FIG. 19 is an explanatory diagram for explaining a CD section of a process identifying the locations of the occurrence of insertion/deletion errors of the decoder illustrated in FIG. 15 in the first embodiment.

In the example illustrated in FIGS. 18 and 19, the total inter-marker Hamming distance for the AB section is 0; the total inter-marker Hamming distance for the BC section is 5; and the total inter-marker Hamming distance for the CD section is 11. Thus, the total inter-marker Hamming distance for the AD section is 16.

Subsequently, the I/D error location identifying module 14 arranges a marker string MA1 assuming the occurrence of a deletion error at the last position (symbol position 1) of the CD section in the receiving string illustrated in FIG. 19. As illustrated in FIG. 19, the marker values at the block position 1 are changed to "00" and "01" as per the marker values for the deletion error illustrated in FIG. 12.

The I/D error location identifying module 14 then calculates the inter-marker Hamming distance between the marker string MA1 and the received string (AD section). In the example illustrated in FIGS. 18 and 19, the total inter-marker Hamming distance for the AB section is 0; the total inter-marker Hamming distance for the BC section is 5; and the total inter-marker Hamming distance for the CD section is 9. Thus, the total inter-marker Hamming distance for the AD section is 14.

In an identical manner, the I/D error location identifying module 14 arranges marker strings MA2 to MA24 assuming the occurrence of a deletion error at the block position 2 to the block position 24, respectively, and calculates the inter-marker Hamming distance between each of the marker strings MA2 to MA24 and the received string.

Figures 20, 21, 22:
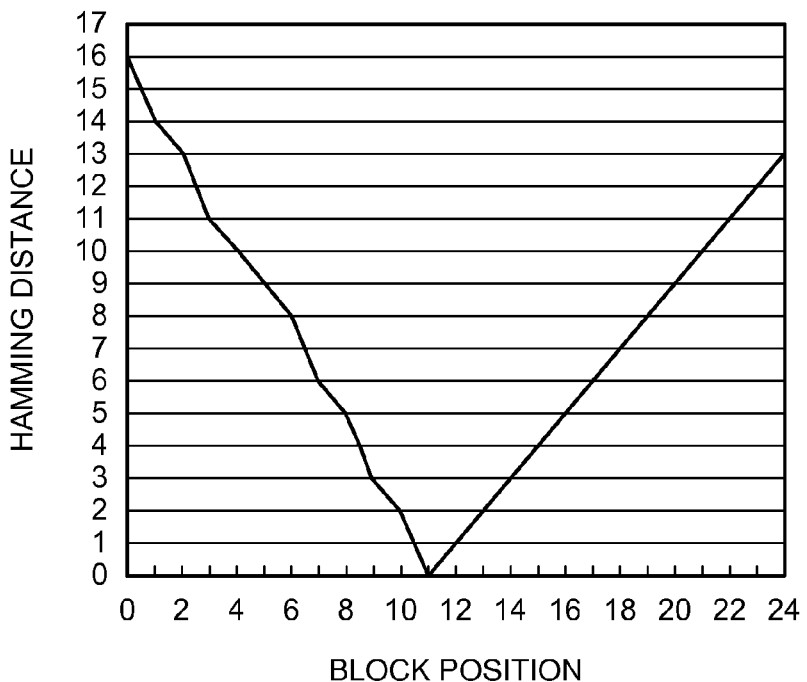
FIG. 20 is an explanatory diagram for explaining a location identifying process by hamming distance illustrated in FIGS. 18 and 19 in the first embodiment.
FIG. 21 is an explanatory diagram for explaining a process identifying the locations of the occurrence of insertion/deletion errors of the decoder illustrated in FIG. 15 with reference to the another received strings in the first embodiment.
FIG. 22 is an explanatory diagram for explaining a process identifying the locations of the occurrence of insertion/deletion errors of the decoder illustrated in FIG. 15 with reference to the other received strings in the first embodiment.

FIG. 20 is an exemplary graph in which the total inter-marker Hamming distance calculated between the marker strings MA0 to MA24, which are arranged assuming the occurrence of a deletion error at the block position 0 to the block position 24, and the received string is represented on the vertical axis and the block positions are represented on the horizontal axis. Meanwhile, at the block position 0, the inter-marker Hamming distance is calculated from the marker string MA0 having no insertion/deletion errors.

As illustrated in FIG. 20, the total inter-marker Hamming distance is shortest at the block position 11. Thus, the I/D error location identifying module 14 determines that a deletion error has occurred at the location of the block number 11 in the received string and outputs that error location to the I/D error correcting module 16.

Explained below is a case of error location identification when the received string includes an insertion/deletion error and a common error exists on a 2-bit marker. In FIGS. 21 and 22, examples of two received strings (received string 1 and received string 2) are illustrated in which an insertion/deletion error exists and a common error exists on a 2-bit marker. With reference to FIGS. 21 and 22, the marker values differ only after the block positions 9 and 11. Moreover, as described above, both the received strings correspond to the AD section.

Figure 23:
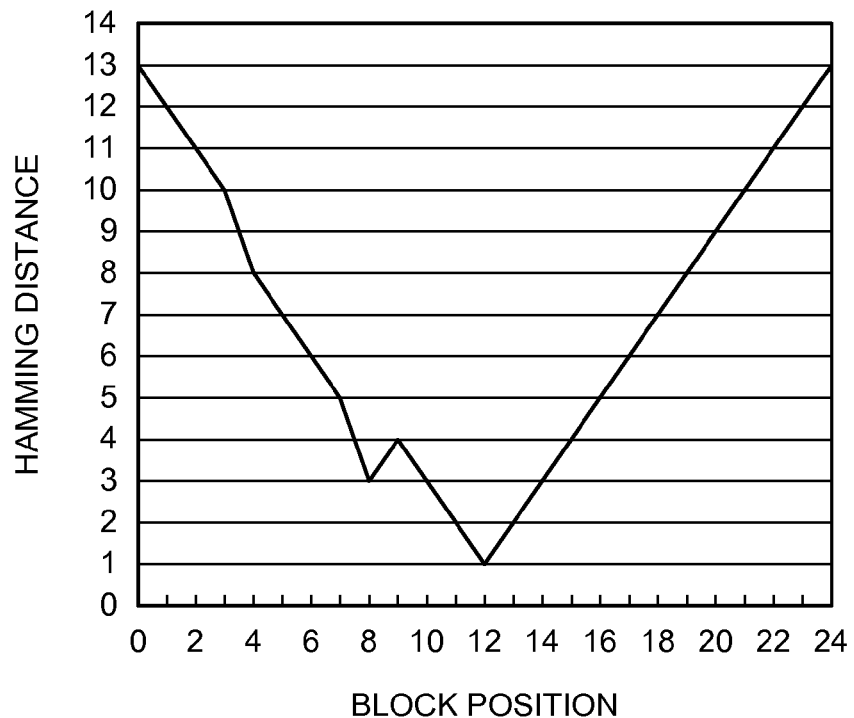
FIG. 23 is an explanatory diagram for explaining a location identifying process by hamming distance in the received string illustrated in FIG. 21 in the first embodiment.

In an identical manner to the above-mentioned description, the inter-marker Hamming distances are calculated with respect to each of the received string 1 and the received string 2 before calculating the respective total inter-marker Hamming distances. FIG. 23 is an exemplary graph representing the result of the total inter-marker Hamming distance at each block position in the received string 1 illustrated in FIG. 21. As illustrated in FIG. 23, regarding the received string 1, the total inter-marker Hamming distance is shortest at the block position 12. Thus, the I/D error location identifying module 14 determines that a deletion error has occurred at the block position 12 and outputs that location.

Figure 24:
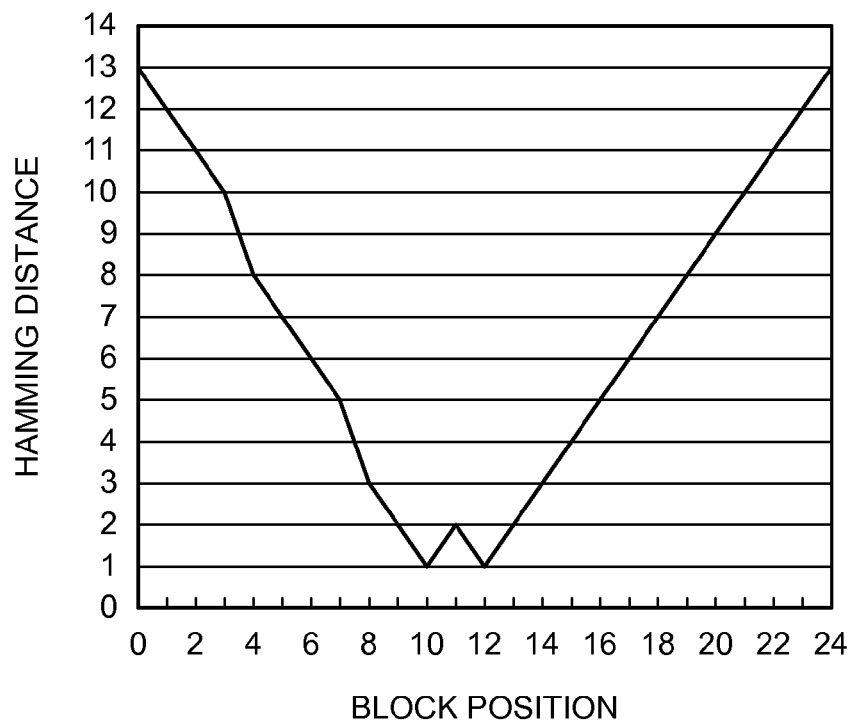
FIG. 24 is an explanatory diagram for explaining a location identifying process by hamming distance in the received string illustrated in FIG. 22 in the first embodiment.

FIG. 24 is an exemplary graph representing the result of the total inter-marker Hamming distance at each block position in the received string 2 illustrated in FIG. 22. As illustrated in FIG. 24, regarding the received string 2, the total inter-marker Hamming distance is shortest at the block positions 10 and 12. Thus, the I/D error location identifying module 14 determines that a deletion error has occurred over the block positions 10 to 12 and outputs those locations.

Figure 25:
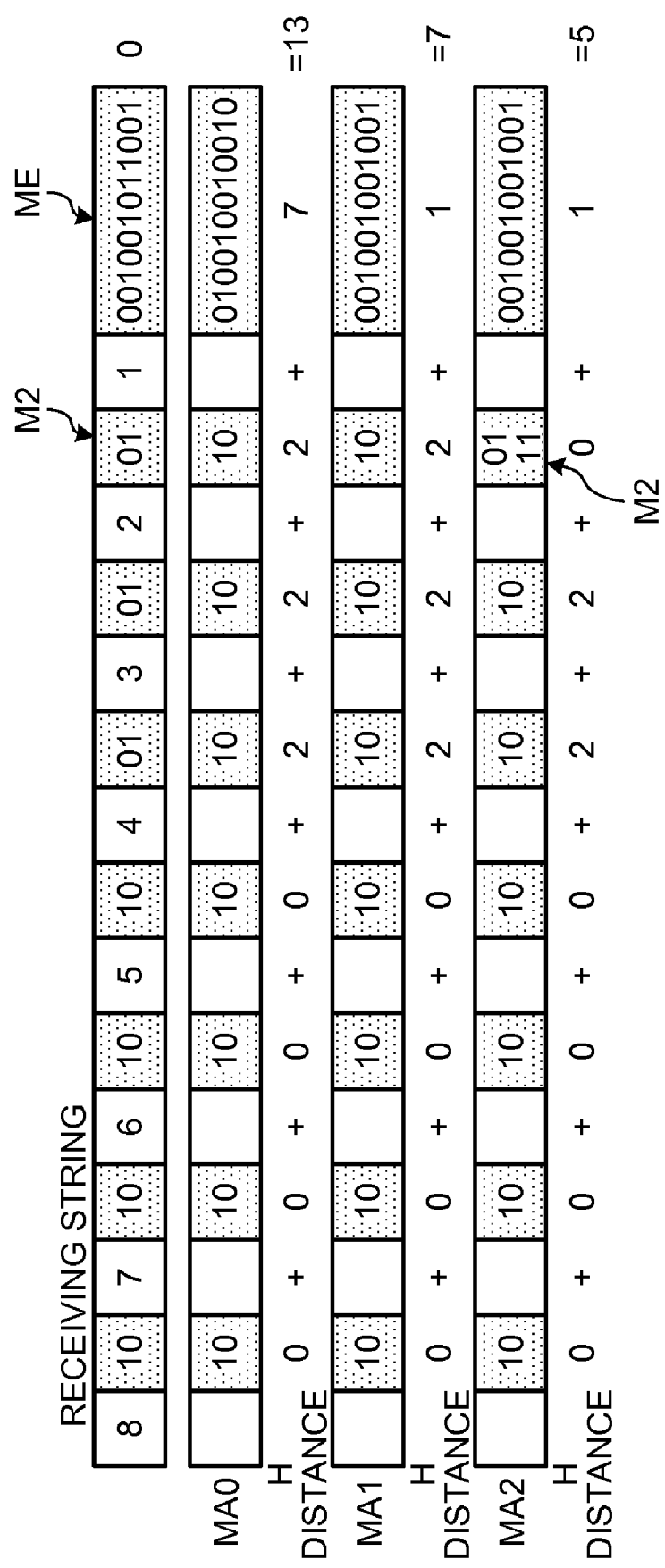
FIG. 25 an explanatory diagram for explaining a process identifying the locations of the occurrence of insertion/deletion errors due to the end marker of the decoder illustrated in FIG. 15 in the first embodiment.
Figure 26:
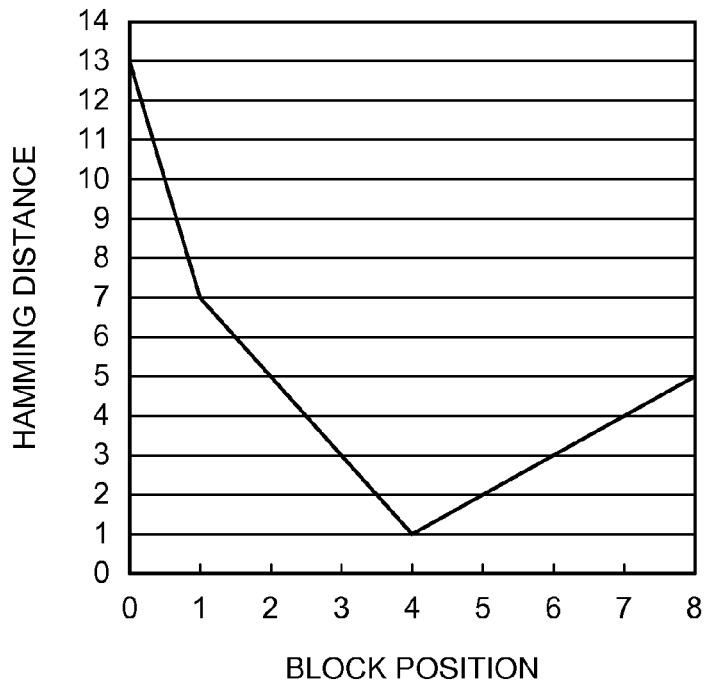
FIG. 26 is an explanatory diagram for explaining a location identifying process by hamming distance in the received string illustrated in FIG. 25 in the first embodiment.

Explained below is an error location identification operation performed using the inter-marker Hamming distance at the end of a sector. FIG. 25 is an explanatory diagram of a received string on which is performed a location identification operation using the inter-marker Hamming distance at the end of the sector. FIG. 26 is an exemplary graph representing the relation between the block positions and the total inter-marker Hamming distance. The received string illustrated in FIG. 25 is an example in which the occurrence of an insertion error triggers a shift error.

Herein, the I/D error location identifying module 14 calculates the inter-marker Hamming distances in essentially the same way as in the case of 2-bit markers. That is, as illustrated in FIG. 25, the I/D error location identifying module 14 arranges the reference string MA0 having an end marker indicating no occurrence of an insertion/deletion error and calculates the inter-marker Hamming distance between the reference string MA0 and the received string. In the example illustrated in FIG. 25, the total inter-marker Hamming distance is 13.

Subsequently, the I/D error location identifying module 14 arranges the reference string MA1 assuming the occurrence of an insertion error at the block number 1 in the receiving string illustrated in FIG. 25. Since a single bit is inserted at the symbol number 1 in the reference string MA1, the marker value of the end marker in the reference string MA0 happens to shift entirely by a single bit. Then, in an identical manner, the I/D error location identifying module 14 calculates the inter-marker Hamming distance between the reference string MA1 and the received string. In the example illustrated in FIG. 25, the total inter-marker Hamming distance is 7.

Subsequently, the I/D error location identifying module 14 arranges a reference string MA2 assuming the occurrence of an insertion error at a 2-bit marker M2 in the receiving string illustrated in FIG. 25. In the example illustrated in FIG. 25, the total inter-marker Hamming distance for the reference string MA2 is 5.

By continuing the same operation, the total inter-marker Hamming distance with respect to each block number is calculated. The calculation result is illustrated in FIG. 26. Herein, the total inter-marker Hamming distance is shortest at the block position 4. Thus, the I/D error location identifying module 14 determines that an insertion error had occurred at the block position 4 and outputs that location.

Figure 27:
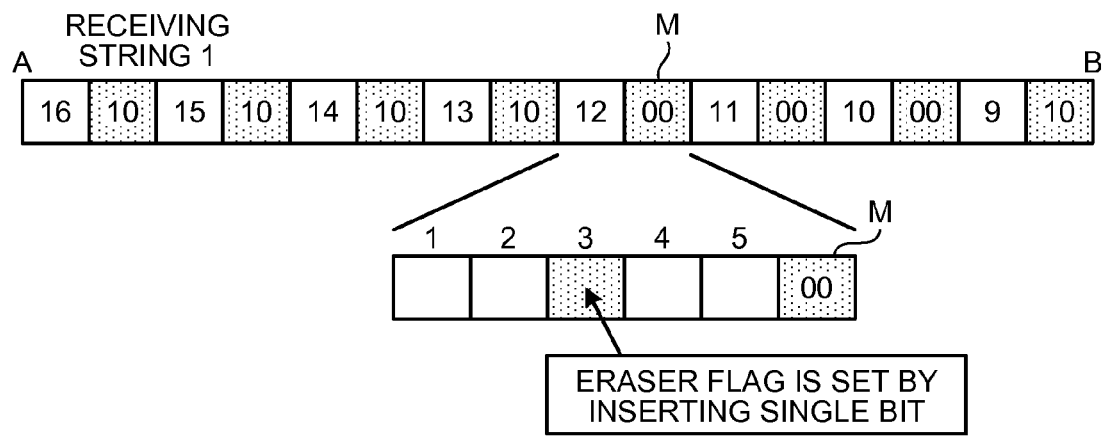
FIG. 27 is an explanatory diagram for explaining an error correction process of the decoder illustrated in FIG. 15 in the first embodiment.
Figure 28:
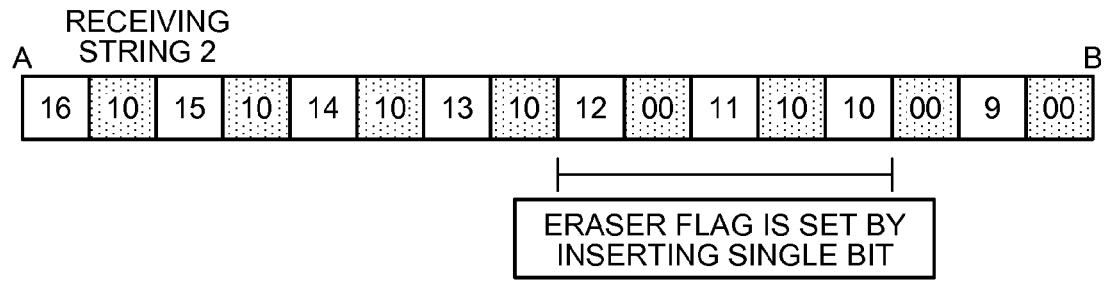
FIG. 28 is an explanatory diagram for explaining the other error correction process of the decoder illustrated in FIG. 15 in the first embodiment.

Given below is the explanation regarding the I/D error correcting module 16. FIGS. 27 and 28 are explanatory diagram for explaining the I/D error correcting operation. The I/D error correcting module 16 performs I/D error correction on the basis of the I/D error location information output by the I/D error location identifying module 14.

For example, with reference to the exemplary received string 1 illustrated in FIG. 21, the I/D error location identifying module 14 determines that a deletion error has occurred at the block position 12 as illustrated in FIG. 23.

The I/D error correcting module 16 receives that information and, as illustrated in FIG. 27, assumes that the deletion error has occurred in the third symbol in the single block (=five symbols) at the block position 12.

Because of the occurrence of a deletion error, the I/D error correcting module 16 then inserts a single bit in that single block. For example, the I/D error correcting module 16 inserts a single bit at the third symbol thereby causing a shift in entirety. However, since forcible insertion of the single bit is highly likely to cause an error symbol, the I/D error correcting module 16 sets an eraser flag at the third symbol. Because of the eraser flag, the ECC decoder 85 recognizes the block as a possible error block and, if an error is detected during ECC correction, performs error correction at the block set with the eraser flag as the error location.

Meanwhile, in the exemplary received string 2 in FIG. 22, the I/D error location identifying module 14 determines that a deletion error has occurred over the block positions 10 to 12 as illustrated in FIG. 24. The I/D error correcting module 16 sets an eraser flag over the block positions 10 to 12 as illustrated in FIG. 28. In addition, the I/D error correcting module 16 performs correction by inserting a single bit at the first bit location of the block position 12 in the received string 2.

Then, the I/D error occurrence determining module 10 determines whether an insertion/deletion error has occurred in the sections subsequent to the location at which error correction has been performed. If an insertion/deletion error is determined to have occurred, then the I/D error location identifying module 14 identifies the location of that error and the I/D error correcting module 16 performs error correction. These operations are repeated until the end of the sector is reached and then error correction is completed.

The sector data upon error correction is then input to the marker removing module 18, which removes all of the 2-bit markers and the end marker from the sector data and then outputs the sector data.

In this way, by referring to a few samples of the marker values, it becomes possible to distinguish between an insertion/deletion error and a common error on a 2-bit marker. Besides, when an insertion/deletion error is determined to have occurred, it is possible to determine whether that error is an insertion error or a deletion error by making use of the number of I/D error values of the samples.

Thus, depending on the condition of a few samples of the marker values, the marker decoder 78 determines whether a bit error has occurred, an insertion error has occurred, or a deletion error has occurred in a marker and accordingly performs error correction.

That is, in comparison with the 2-bit marker method, it is possible to determine whether a common error has occurred in a marker by making use of the nature of insertion/deletion errors in which, once an insertion/deletion error occurs, the subsequent insertion/deletion error does not occur for a while. That enables preventing inaccurate correction from being performed. Meanwhile, if it cannot be determined whether a common error has occurred, then an eraser flag is set in order to prevent inaccurate correction from being performed.

Moreover, the nature of insertion/deletion errors is such that the area in which an insertion error occurs is separated from the area in which a deletion error occurs. That point can also be put to use. That is, when an insertion error or a deletion error occurs for the first time in a sector; the information regarding that error can be stored so that, at the time of occurrence of an insertion/deletion error for the second time or more, it can be determined whether an insertion error has occurred or a deletion error has occurred by referring to the stored information regarding the first error. That enables preventing inaccurate correction from being performed.

Figure 29:
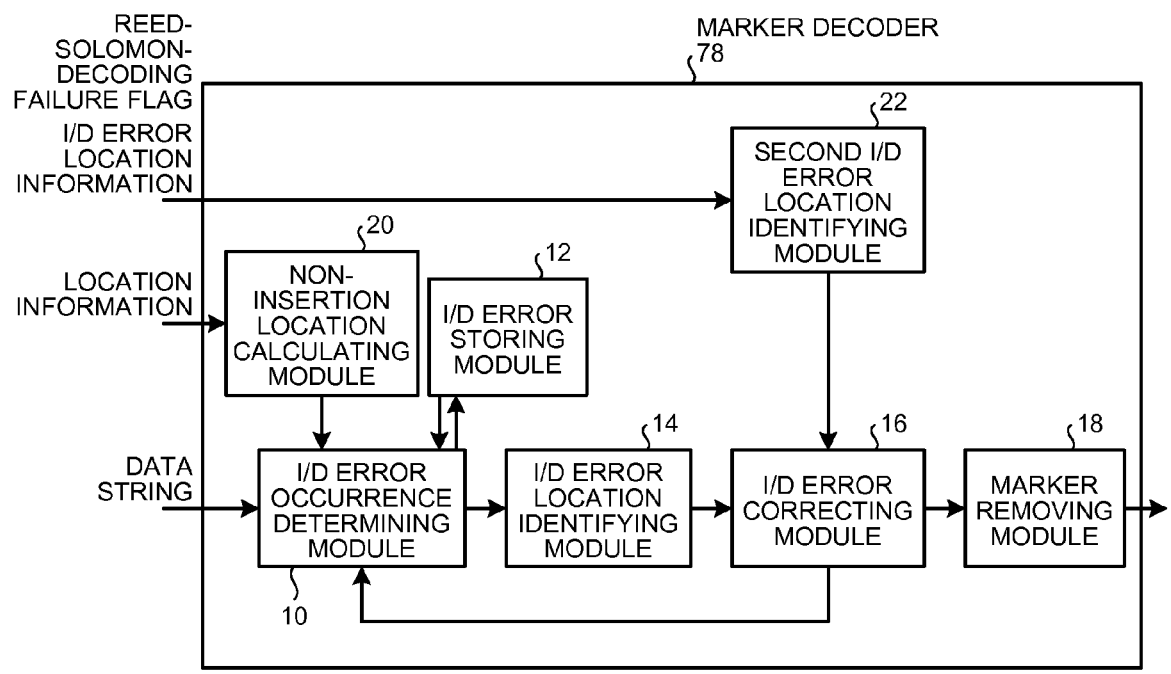
FIG. 29 is an exemplary block diagram of a second embodiment of the marker decoder.
Figure 30:
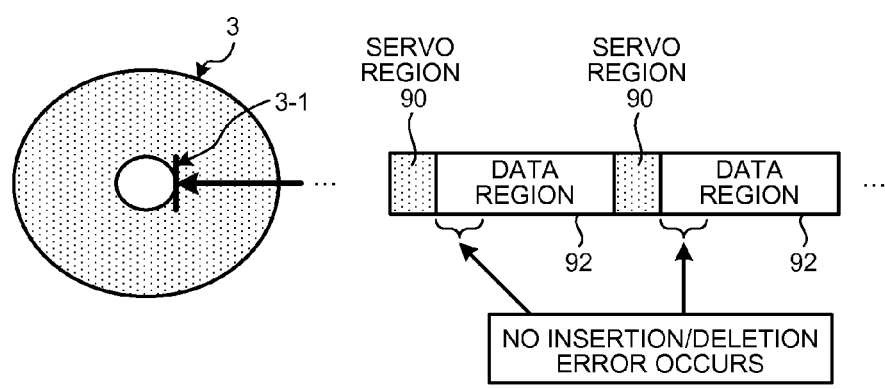
FIG. 30 is an explanatory diagram for explaining a non-insertion operation of the 2-bit marker of the decoder illustrated in FIG. 29.

FIG. 29 is an exemplary block diagram of the marker decoder 78 according to a second embodiment. FIG. 30 is an explanatory diagram for explaining a non-insertion location calculating module according to the second embodiment described with reference to FIG. 29. In the marker decoder 78 illustrated in FIG. 29, the constituents elements identical to those illustrated in FIG. 15 are referred to by the same reference numerals. Herein, the marker decoder 78 comprises the I/D error occurrence determining module 10, the I/D error location identifying module 14, the I/D error correcting module 16, the marker removing module 18, and the I/D error storing module 12.

In addition, the marker decoder 78 comprises a non-insertion location calculating module 20 for detecting locations without marker insertions by making use of location information and comprises a second I/D error location identifying module 22.

As described later, if the ECC decoder 85 fails in the decoding of a sector, then the second I/D error location identifying module 22 receives error location information on insertion/deletion errors that have occurred in neighboring sectors, estimates the location of the insertion/deletion error to be corrected by referring to the received information, and instructs the I/D error correcting module 16 to perform error correction. Such functionality enables achieving enhancement in the error correcting capability.

The non-insertion location calculating module 20 is associated with the non-insertion location calculating module 40 disposed in the marker coder 70 illustrated in FIG. 9. When the phase of write synchronization is adjusted, no insertion/deletion error occurs for a while. Thus, after the adjustment in the phase of write synchronization, insertion of 2-bit markers is suspended for a while.

The explanation regarding the non-insertion of 2-bit markers is given with reference to FIG. 30, which is an explanatory schematic diagram illustrating servo regions 90 and data regions 92 in a single track on the magnetic disk 3. As illustrated in FIG. 30, on a track 3-1 is formed the servo regions 90 in plurality and the data regions 92 in plurality. The phase including the write clock is adjusted in servo units.

For that reason, in accordance with the rotating velocity of the magnetic disk 3, the write clock gets synchronized with the servo signals of the servo regions 90. Moreover, no insertion/deletion occurs for a while from the leading end of the data regions 92. In other words, for a while, the write clock and the recording dots on the magnetic disk 3 do not fall out of alignment.

Hence, there is no point in inserting 2-bit markers in the portion that is not out of alignment. By not inserting 2-bit markers in such a portion, redundancy can be reduced.

While performing the non-insertion operation, the positional relation between the servo regions, the data regions, and the sectors is stored in advance in a memory and then it is determined whether a location corresponds to a non-insertion location.

For example, if it is assumed that the leading end of a data region 92 is same as that of the corresponding sector and that no insertion/deletion error occurs till the 10000-th bit from the leading end of that data region 92, then it is possible to reduce redundancy in the following manner and enhance the coding ratio.

As an example, following conditions are set for calculating the coding ratio. Firstly, in a sector having the sector size of 4 kilobytes=32000 bits, a 2-bit marker is inserted after every 60 bits (five symbols) not subjected to the non-insertion operation. For the first 100 bits subjected to the non-insertion operation, 2-bit markers are not inserted. From the 10001-st bit onward among the bits subjected to the non-insertion operation, a 2-bit marker is inserted after every 60 bits.

In that case, in the bits not subjected to the non-insertion operation, the total number of inserted bits is 1066; and in the bits subjected to the non-insertion operation, the total number of inserted bits is 734.

Thus, the coding ratio for the bits not subjected to the non-insertion operation is $32000/(32000+1066) \approx 0.967$ and the coding ratio for the bits subjected to the non-insertion operation is $32000/(32000+734) \approx 0.977$. In this way, when the non-insertion operation is performed, the coding ratio improves by 0.01 as compared to when the non-insertion operation is not performed.

While performing the non-insertion operation of 2-bit markers, the non-insertion location calculating module 40 is additionally disposed in the marker coder 70 as illustrated in FIG. 9. To the non-insertion location calculating module 40, the relational position information is input from the memory. With the use of the relational position information, the non-insertion location calculating module 40 calculates that bit in a sector which corresponds to the leading end of the corresponding data region.

For example, if the calculation indicates that the 100-th bit in a sector corresponds to the leading end of the corresponding data region; then, in order to make sure that 2-bit markers are not inserted between the 200-th bit and the 10100-th bit, the non-insertion location calculating module 40 outputs starting location/end location information (starting location, end location)=(200-th bit, 10100-th bit) to the 2-bit marker inserting module 42.

By referring to the starting location/end location information, the 2-bit marker inserting module 42 performs an operation to make sure that 2-bit markers are not inserted between the 200-th bit and the 10100-th bit of the input data string.

Herein, the starting location to the 200-th bit and not to the 100-th bit because, if an insertion/deletion error occurs just before the 100-th bit, then the absence of a marker makes it difficult to detect that error.

Meanwhile, in an identical manner to the above-mentioned case, the non-insertion location calculating module 20 is additionally disposed in the marker decoder 78 illustrated in FIG. 29. To the non-insertion location calculating module 20, the relational position information is input from the memory. With the use of the relational position information, the non-insertion location calculating module 20 calculates that bit in a sector which corresponds to the leading end of the corresponding data region.

For example, if the calculation indicates that the 100-th bit in a sector corresponds to the leading end of the corresponding data region; then, in order to make sure that 2-bit marker errors are not detected between the 200-th bit and the 10100-th bit, the non-insertion location calculating module 20 outputs starting location/end location information (starting location, end location)=(200-th bit, 10100-th bit) to the I/D error occurrence determining module 10.

By referring to the starting location/end location information, the I/D error occurrence determining module 10 performs an operation to make sure that 2-bit marker errors are not detected between the 200-th bit and the 10100-th bit of the input data string.

Explained below is a decoding method using the second I/D error location identifying module 22 illustrated in FIG. 29. When an insertion/deletion error occurs in a particular data region on a particular track, there is a high probability that insertion/deletion errors occur at almost the same location in the neighboring data regions or in the neighboring tracks. Thus, it is believed that a correlation exists between tracks/data regions and locations of insertion/deletion errors.

Hence, if the ECC decoder 85 fails in the decoding of a sector, then decoding is performed on the neighboring sectors (on the same track or on the neighboring tracks) by re-reading and the insertion/deletion error location information obtained by decoding is stored in a memory.

At the time of repeating the decoding of a sector on which Reed-Solomon decoding had failed, the marker decoder 78 identifies the locations of insertion/deletion errors by referring to the insertion/deletion error location information stored in the memory and then performs error correction.

In order to obtain the information regarding the locations of insertion/deletion errors; the positional relation between the servo regions, the data regions, and the sectors needs to be known. Hence, that relational position information is stored in advance in the memory.

In the decoding method using the second I/D error location identifying module 22, the I/D error occurrence determining module 10, the I/D error location identifying module 14, the non-insertion location calculating module 20, and the I/D error storing module 12 are not used.

The second I/D error location identifying module 22 receives a Reed-Solomon-decoding failure flag and the insertion/deletion error location information, and identifies the bit location at which an insertion/deletion error is thought to have occurred.

Consider a case in which, the second I/D error location identifying module 22 determines that an insertion error has occurred at the 20100-th bit using the insertion/deletion error location information of the first of the other sectors and determines that an insertion error has occurred at the 20120-th bit using the insertion/deletion error location information of the second of the other sectors. Then, the second I/D error location identifying module 22 determines that an insertion error has occurred in the section between the 20081-st bit and the 20140-th bit.

Subsequently, the second I/D error location identifying module 22 outputs starting location/end location information (starting location, end location)=(20081-st bit, 20140-th bit) to the I/D error correcting module 16. Upon receiving the starting location/end location information, the I/D error correcting module 16 sets an eraser flag with respect to the symbols including the section between the 20081-st bit and the 20140-th bit and performs error correction by removing the 20081-st bit.

The marker removing module 18 then removes all of the markers and outputs the data.

In this way, a functionality is provided by which, when decoding of a sector is not successful, information is obtained on the locations of insertion/deletion errors that have occurred in neighboring sectors and, with reference to that information, error correction is repeated by estimating the location of the insertion/deletion error to be corrected. That enables achieving improvement in the error correcting capability.

Moreover, when the phase of write synchronization is adjusted, no insertion/deletion error occurs for a while. Thus, after the adjustment in the phase of write synchronization, insertion of 2-bit markers is suspended for a while.

According to the abovementioned embodiments, it is determined, in accordance with condition of a plurality of samples of 2-bit markers inserted for a data string, whether a 2-bit marker has a bit error, an insertion error, or a deletion error, and the error correction is performed. Consequently, a shift error due to inaccurate correction based on a marker error can be prevented, thereby a burst error can be prevented.

In the abovementioned embodiments, a magnetic disk device with a bit-patterned medium is used as the disk device. Alternatively, the embodiments are also applicable to a disk device that performs recording with different write synchronization. Moreover, in the description given above, the number of reference samples of the 2-bit markers is assumed to be eight. However, it is possible to use more than one, preferably four or more, samples.

Furthermore, instead of using a Reed-Solomon code for performing error correction as described above, it is also possible to perform error correction with the use of a low-density parity-check code (LDPC).

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A disk storage device comprising:
a marker coder configured to modify a data string by inserting a plurality of 2-bit markers at predetermined intervals;
a head configured to record the modified data string on a disk medium, and to read a recorded data string from the disk medium;
a marker decoder configured to sample a plurality of the 2-bit markers in the recorded data string, to detect a 2-bit marker error, an insertion error, or a deletion error, and to output a bit sequence comprising the recorded data string from which the 2-bit markers are removed; and an error corrector configured to perform a first error correction on the bit sequence received from the marker decoder by using an error correcting code in the recorded data string, wherein the marker decoder is further configured to perform a second error correction when an insertion error or a deletion error is detected.

2. The disk storage device of claim 1, wherein the marker decoder is further configured to restrict the second error correction when only a 2-bit marker error is detected.

3. The disk storage device of claim 1, wherein the marker decoder comprises:

an I/D error detector configured to sample the 2-bit markers from the data string and to detect a 2-bit marker error, an insertion error, or a deletion error;

a location identifier configured to receive, from the I/D error detector, a detection result indicating whether either an insertion error or a deletion error has been detected, and configured to identify an error location of the insertion error or the deletion error;

an I/D error corrector configured to perform the second error correction at the error location; and a marker remover configured to remove the 2-bit markers from the data string.

4. The disk storage device of claim 1, wherein the marker decoder is configured to repeat the second error correction if the first error correction is not successful.

5. The disk storage device of claim 1, wherein the marker decoder is configured to set an eraser flag at a location in the data string that is subjected to the second error correction.

6. The disk storage device of claim 1, wherein the data string further comprises an end marker comprising three or more bits inserted at an end of the data string, and wherein the marker decoder is further configured to detect an insertion error or a deletion error at the end of the data string from a value of the end marker.

7. The disk storage device of claim 1, wherein the marker decoder is configured to perform the second error correction by removing a single bit from a location in the data string at which an insertion error is detected and by inserting a single bit at a location in the data string at which a deletion error is detected.

8. The disk storage device of claim 7, wherein the marker decoder is configured to perform the second error correction by removing a single bit from a location at the center of two 2-bit markers at which insertion errors are detected and by inserting a single bit at a location at the center of two 2-bit markers at which the deletion errors are detected.

9. The disk storage device of claim 1, wherein the marker decoder is configured to store location information of a location at which an insertion error or a deletion error is detected; and wherein the marker decoder is configured to, at time of reading the location, refer to the stored location information and determine whether the data string has the insertion error or the deletion error.

10. The disk storage device of claim 1, wherein the marker coder is configured to restrict insertion of the 2-bit markers with respect to data that contains no insertion or deletion errors.

11. The disk storage device of claim 4, wherein the marker decoder is configured to repeat the second error correction using location information of an insertion error or a detection error in a neighboring data string in the disk medium.

12. The disk storage device of claim 1, wherein the disk medium comprises a bit-patterned medium with isolated recording dots formed thereon.

* * * * *